(12) United States Patent
Nilsson

(10) Patent No.: US 8,123,265 B2
(45) Date of Patent: Feb. 28, 2012

(54) BUMPER BEAM

(75) Inventor: Johan Nilsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 12/451,559

(22) PCT Filed: May 9, 2008

(86) PCT No.: PCT/SE2008/000315
§ 371 (c)(1),
(2), (4) Date: Nov. 18, 2009

(87) PCT Pub. No.: WO2008/147276
PCT Pub. Date: Dec. 4, 2008

(65) Prior Publication Data
US 2010/0090481 A1  Apr. 15, 2010

(30) Foreign Application Priority Data
May 30, 2007 (SE) ........................... 0701298

(51) Int. Cl.
*B60R 19/04* (2006.01)

(52) U.S. Cl. .................................... 293/155; 293/133
(58) Field of Classification Search .................. 293/102, 293/122, 154, 155, 133
See application file for complete search history.

(56) References Cited

U.S. PATENT DOCUMENTS

| | | | | |
|---|---|---|---|---|
| 4,875,728 A * | 10/1989 | Copp et al. | ..... | 293/126 |
| 5,080,412 A * | 1/1992 | Stewart et al. | ..... | 293/155 |
| 5,722,708 A * | 3/1998 | Jonsson | ..... | 293/102 |
| 5,803,517 A * | 9/1998 | Shibuya | ..... | 293/120 |
| 6,179,353 B1 * | 1/2001 | Heatherington et al. | ..... | 293/122 |
| 6,334,638 B1 * | 1/2002 | Yamamuro et al. | ..... | 293/133 |
| 6,474,709 B2 * | 11/2002 | Artner | ..... | 293/133 |
| 6,712,411 B2 * | 3/2004 | Gotanda et al. | ..... | 293/155 |
| 6,733,055 B2 * | 5/2004 | Iino | ..... | 293/142 |
| 6,863,321 B2 * | 3/2005 | Jonsson et al. | ..... | 293/102 |
| 6,918,621 B2 * | 7/2005 | Seksaria | ..... | 293/133 |
| 6,962,380 B2 * | 11/2005 | Lee | ..... | 293/155 |

FOREIGN PATENT DOCUMENTS

| | | |
|---|---|---|
| DE | 19751513 A1 | 6/1999 |
| DE | 19959701 A1 | 6/2001 |
| EP | 1762438 A1 | 3/2007 |
| WO | WO 2007/035162 A1 | 3/2007 |

* cited by examiner

*Primary Examiner* — Glenn Dayoan
*Assistant Examiner* — Pinel Romain
(74) *Attorney, Agent, or Firm* — Mark P. Stone

(57) ABSTRACT

A bumper beam has a hat shaped profile and is turned with the crown (12-14) towards the vehicle and has a lid (17) that gives the bumper beam a closed profile. The bumper beam has two mountings (20, 21) that usually are adapted to be fitted to the side rails of the vehicle. The mountings (20, 21; 40) consist of a plate formed from one piece that has two standing sides (23, 24; 43, 44) and from these out-turned flanges (25, 26) with holes (28) for mounting to the vehicle, where the standing sides have cut-outs (27) adapted for the bottom and sides of the bumper beam and are welded to these.

6 Claims, 5 Drawing Sheets

BUMPER BEAM

FIELD OF THE INVENTION

The present invention relates to a bumper beam for vehicles with mountings to the vehicle at its ends, where the bumper beam has a U-profile with its bottom towards the vehicle, and an upper and a lower side.

BACKGROUND OF THE INVENTION

Bumper beams are usually attached to the side rails of the vehicle and are usually attached with complicated and expensive intermediate fixing elements, so called crash boxes.

OBJECTS OF THE INVENTION AND BRIEF DESCRIPTION OF THE INVENTION

It is an object of the invention to have a simple and cheap but at the same time a sturdy attachment of the bumper. It is also an object of the invention that the mountings of the bumper should resist the twisting of the beam in a collision. These objects are fulfilled when each mounting consists of a plate formed from one piece that has two standing sides and from these out-turned flanges with holes for mounting to the vehicle, the standing sides having cut-outs adapted for the bottom and sides of the bumper beam and welded to the beam. The invention is defined by the claims.

SHORT DESCRIPTION OF THE DRAWINGS THAT SHOW AN EMBODIMENT THE INVENTION

FIG. 1 shows as an example of the invention, a bumper beam with mountings. The beam is shown in perspective obliquely towards the vehicle.

FIG. 2 corresponds to FIG. 1, but shows the beam fitted with an energy-absorbing foam body.

DETAILED DESCRIPTION OF THE SHOWN AND PREFERRED EMBODIMENT

Figure 1:
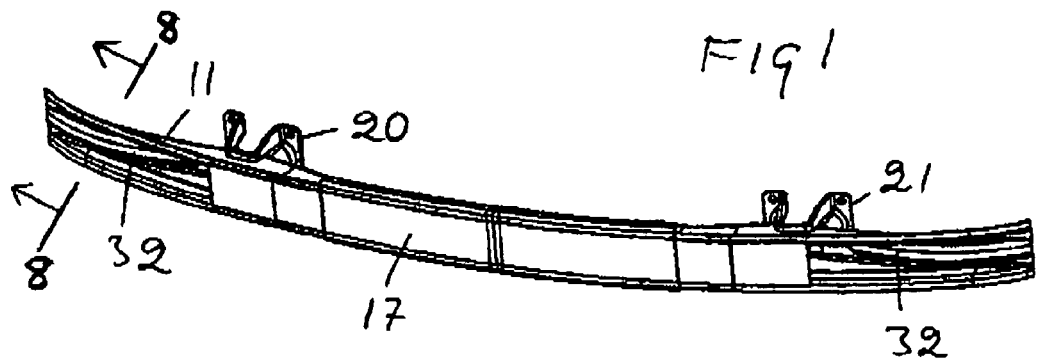

The bumper beam consists of a hat beam 11, and a cover 17. The hat beam consists of a central flange 12, i.e. the bottom of the profile, and two webs 13, 14, i.e. an upper and a lower side. The webs end with the side flanges 15, 16 of the hat profile. The central flange and the webs constitute the crown of the hat beam. The cover 17 is welded to the side flanges of the central part of the beam, and an energy absorbent body 18, e.g. an EPP foam body, is glued to the cover. The cover gives the beam a closed profile, but leaves the ends open.

At the ends of the beam are two mountings 20, 21, with which it may be fitted to structural parts of the vehicle, usually to the two side rails of the vehicle. These mountings have the shape of short, standing beams with hat profiles with a central flange 22, two webs 23, 24 and side flanges 25, 26. The central flange and web of a mounting form a crown which has a cut-out 27 that is adapted to the bumper beam and is welded to the bumper beam with line welds both along the two webs of the bumper beam and along its central flange. The mounting may be stiffened by bending the webs as is shown. The side flanges 25, 26 of the mountings 20, 21, have holes 28 for fixing with bolts on to the vehicle. The webs 23, 24 will thus give support with standing plates both against the bottom and the top sides of the beam 11, and will therefore provide great resistance to any twisting of the beam. In case of collisions that strike vertically above or below the centerline of the beam, the loads of the collisions will impart a torque on the beam that will effectively be counteracted by the mountings.

Figure 2:
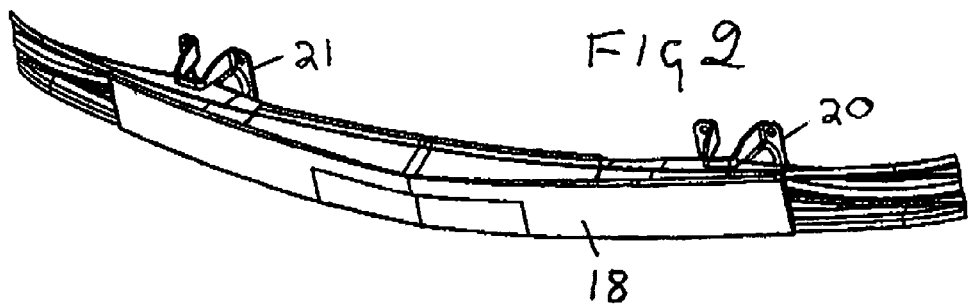
Figure 4:
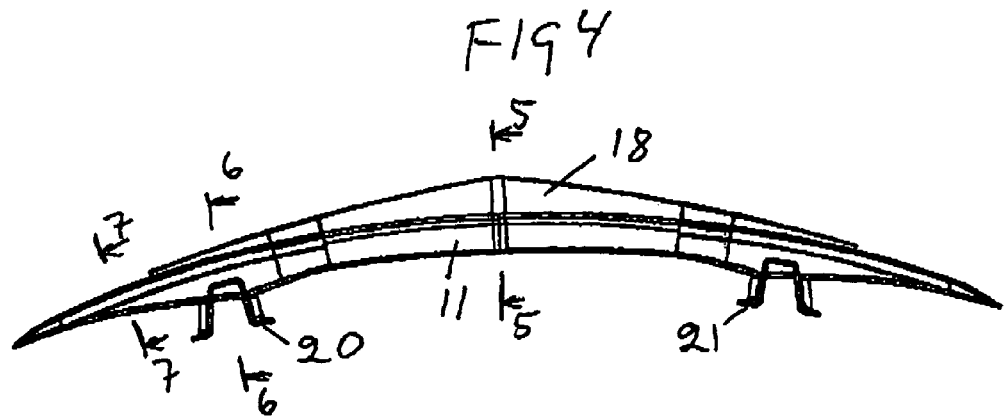
FIG. 4 is a top view of the beam with the foam body.
Figure 5:
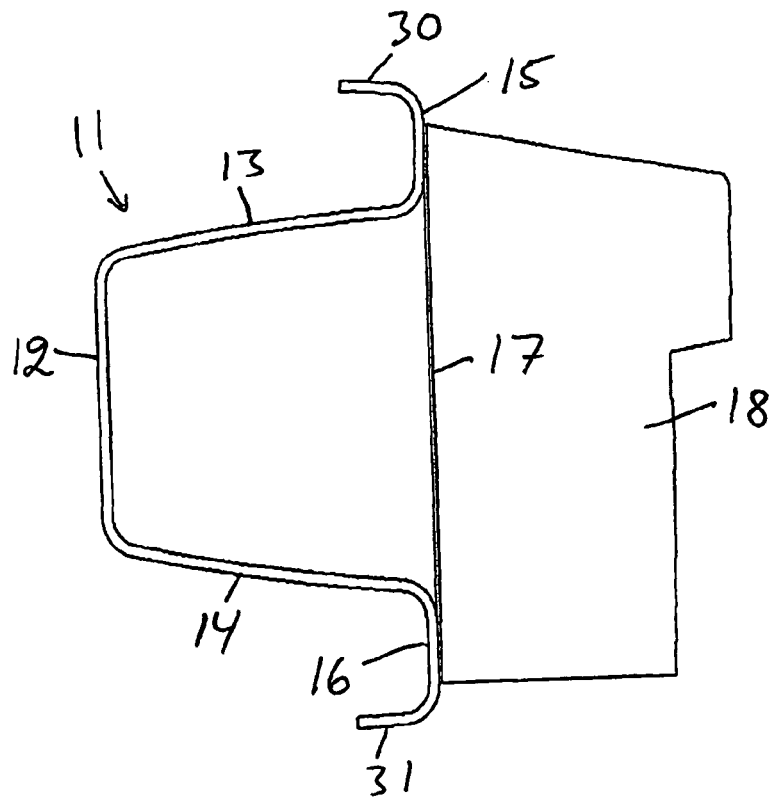
FIG. 5 is a cross section indicated with the line 5-5 in FIG. 4.
Figure 6:
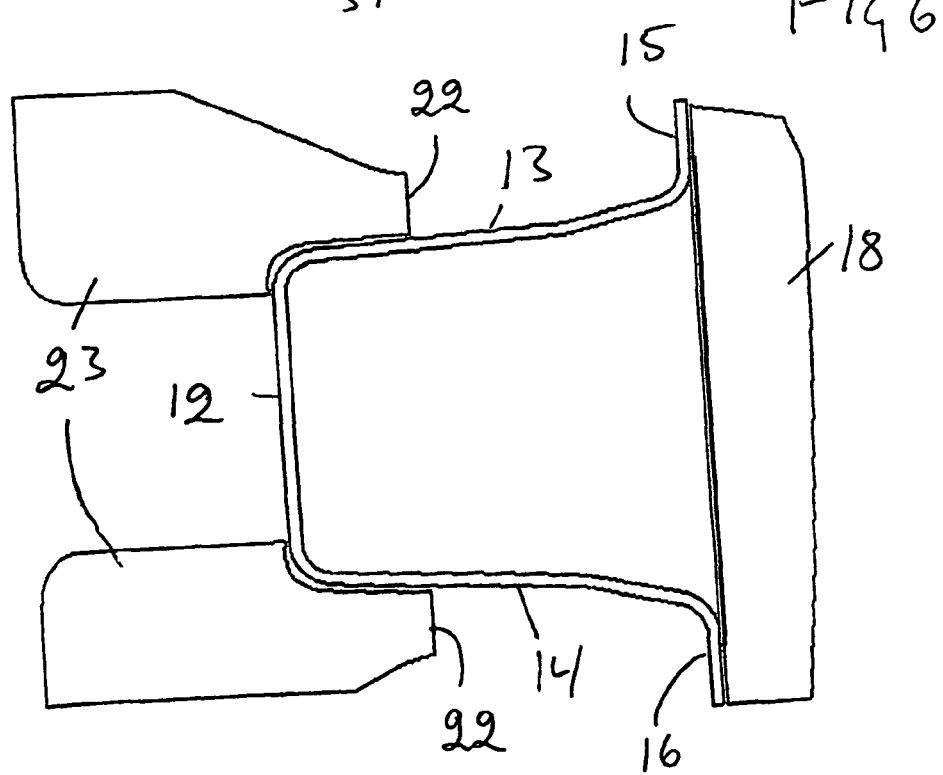
FIG. 6 is a cross section indicated with the line 6-6 in FIG. 4.
Figure 7:
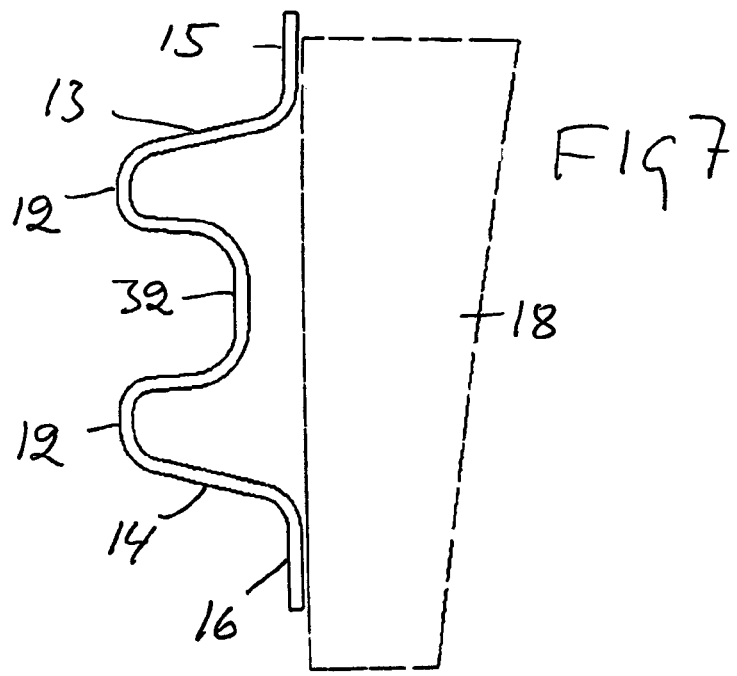
FIG. 7 is a cross section indicated with the line 7-7 in FIG. 4.

The hat beam 11 has a varied hat profile along its length. The profile height is at its tallest at the mountings and on a middle section 29, the edges of the side flanges are turned up into bends 30, 31. At the mountings where the profile is high, the side flanges have no bent edges. On both sides outside the mountings 20, 21, the central flange has an indentation 32, whose depth gradually decreases towards the ends so that the depth of the profile lessens. The cover 17 covers the mountings 20, 21, but not the ends outside the mountings, and the foam body 18 may end where the cover 17 ends such as is shown in FIGS. 2 and 4. Alternatively, the foam body can also cover the illustrated open portions of the beam 11 as is shown with the broken lines of FIGS. 7 and 8, or the foam body may be omitted.

Figure 9:
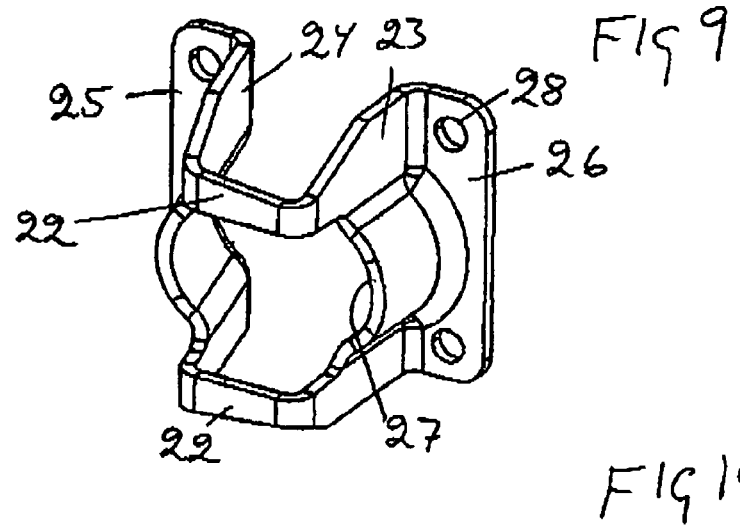
FIG. 9 is a perspective view of one of the two mountings that are shown on the other figures.
Figure 8:
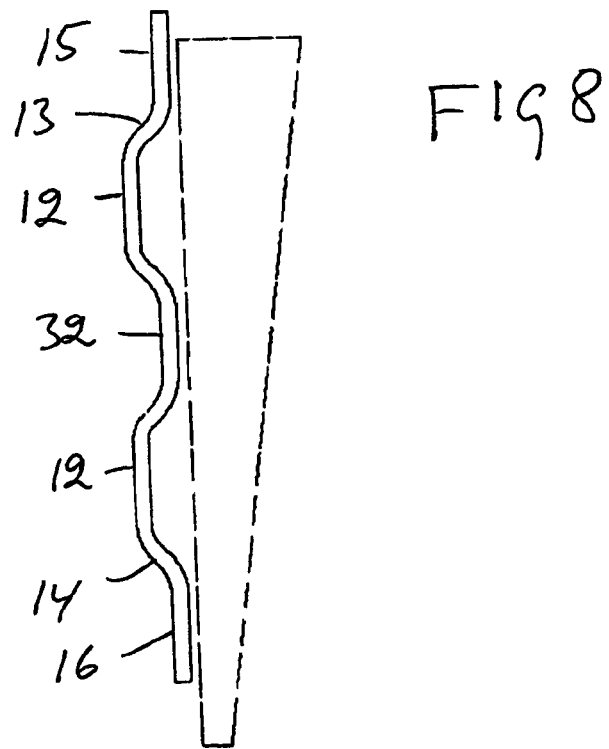
FIG. 8 is an end view as indicated with the arrows 8 in FIG. 1.

The part of the bumper that is between the mountings 20, 21 is very strong because it has a closed comparatively high profile, i.e. a high profile in the horizontal plane. Outside the mountings, the height of the profile gradually decreases as is shown in FIGS. 8 and 9, but the indentation 32 gives the result that the strength does not decrease so quickly towards the ends even though the height of the profile decreases. The bumper beam according to this invention is not only to be used with the mountings shown, but can also be used for example with longer crash boxes.

Figure 10:
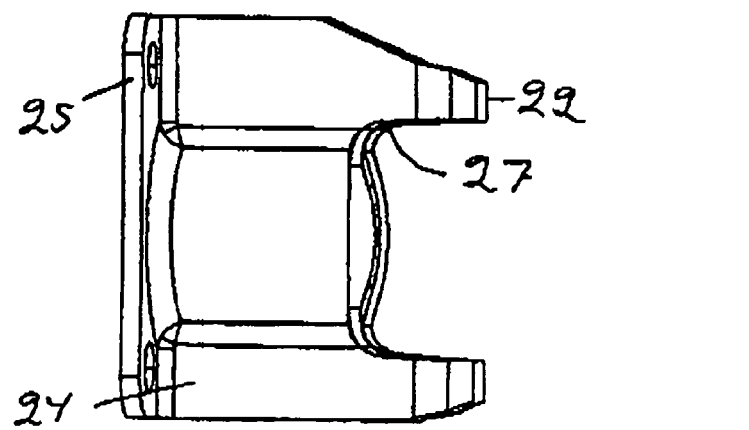
FIG. 10 is a side view of the mounting as shown in FIG. 9.
Figure 3:
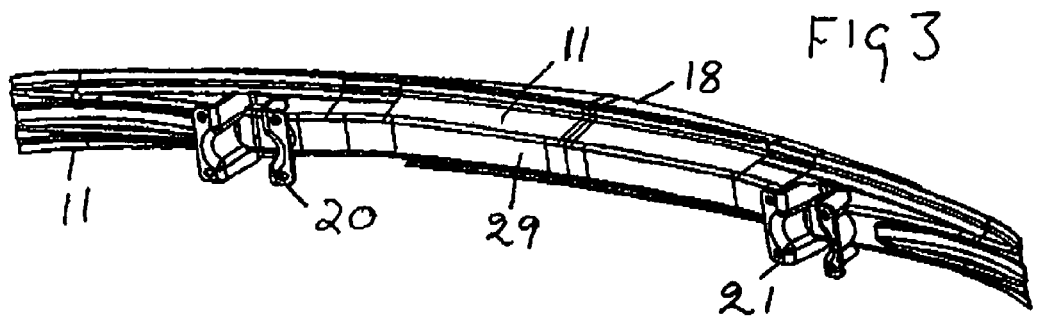
FIG. 3 shows the same beam obliquely from the outside and it is shown with the energy-absorbing foam body.
Figure 11:
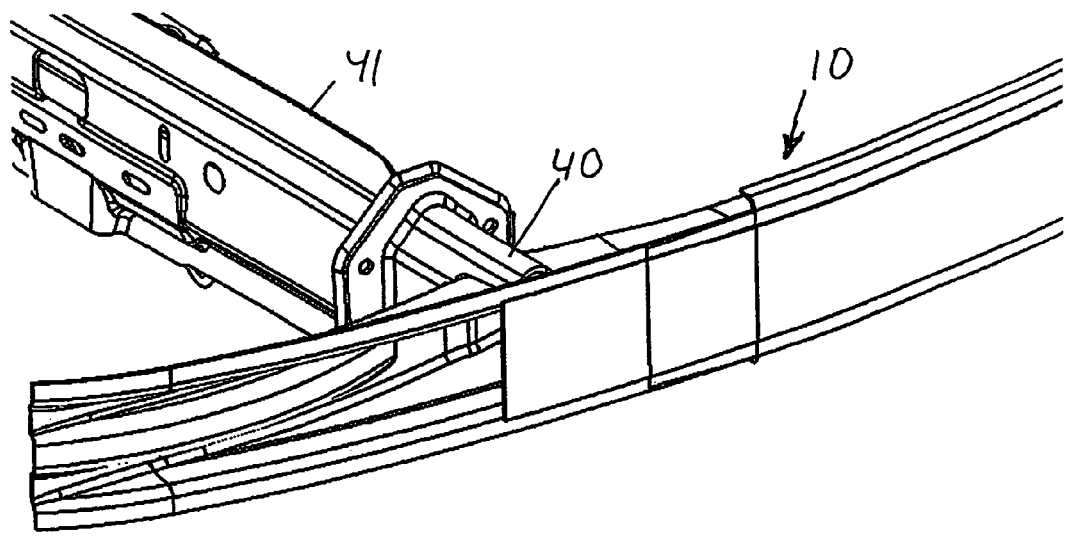
FIG. 11 shows one side of the bumper beam of FIG. 1 but with modified mountings.

FIG. 11 shows the same bumper beam 10 as in FIG. 1, but it shows a mounting 40 that is modified compared to the mountings shown in FIGS. 9 and 10. The mounting 40 is shown bolted to a side rail 41 of a vehicle. The mounting 40 that is shown separately as FIG. 12 has a U-shape with legs 43, 44, which correspond to the webs 23, 24 in the FIGS. 9 and 10 and has the corresponding cutouts 27. The legs and the webs constitute the standing sides of the mountings. Turned out flanges 45, 46, correspond to the side flanges 25, 26 in FIGS. 9 and 10, but they are connected and stretch themselves as a continuous flange 47 going round the U-shape. They have mounting holes 28 that correspond to the mounting holes 28 in FIGS. 9 and 10.

Figure 12:
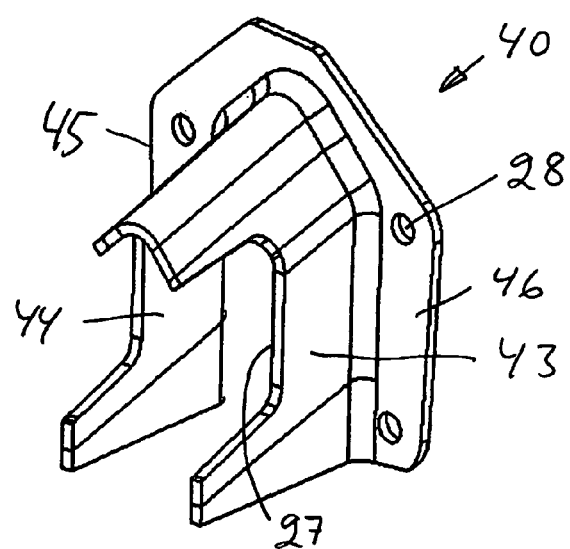
FIG. 12 is a perspective view of a mounting as shown in FIG. 11.

The mounting in FIGS. 9 and 10 is stiffened by the bulging of the webs. The mounting in FIG. 12 is in a corresponding way stiffened by having a continuous U-shape. Both these shapes give lateral stiffness.

Both the shown versions of mountings are formed from one piece by forming, chiefly cold forming, from a flat steel plate and it integrates crash box and mounting plate, which make the mountings easy to make at a low cost.

In the examples the bumper beam is shown as a hat beam with a cover, that is, the bumper beam is essentially a U-beam.

The bumper beam shown is primarily aimed at being used as a front bumper, but the invention may also be used for a rear bumper.

The invention claimed is:

1. Bumper beam for vehicles with mountings (20, 21; 40) to the vehicle at its ends, where the bumper beam has a U-profile with its bottom (12) towards the vehicle, and an upper and a lower side (13, 14), characterized in that each said mounting (20, 21; 40) consists of a plate formed from one piece that has two standing sides (23, 24; 43, 44) and out-turned flanges (25, 26) with holes (28) extending from the standing sides for mounting to the vehicle, the standing sides having cut-outs (27) which receive the bottom and sides of the bumper beam and which are welded to the beam.

2. Bumper beam according to claim 1, characterized in that both said mountings (20, 21) consist of a hat profile with a central flange (22) that couples the two side flanges together both below and above the cut-outs.

3. Bumper beam according to claim 1, characterized in that both said mountings (40) have a U-shape as seen in the horizontal direction and the out-turned flanges (25, 26) are part of a continuous flange (47) that has a U-shape and extends around the U-shape of the mounting.

4. Bumper beam according to claim 1, characterized in that the bumper beam has a hat profile (11) as the upper and lower sides of the U-profile end with flanges (15, 16), a cover (17) being welded to these flanges so that the bumper beam has a closed profile at least along a part of its length.

5. Bumper beam accordingly to claim 2, characterized in that the bumper beam has an open hat profile (11) as the upper and lower sides of the U-profile end with flanges (15, 16), a cover (17) being welded to these flanges so that the bumper beam has a closed profile at least along a part of its length.

6. Bumper beam according to claim 3, characterized in that the bumper beam has an open hat profile (11) as the upper and lower sides of the U-profile end with flanges (15, 16), a cover (17) being welded to these flanges so that the bumper beam has a closed profile at least along a part of its length.

* * * * *